United States Patent
Bernhard et al.

(10) Patent No.: US 10,739,363 B2
(45) Date of Patent: Aug. 11, 2020

(54) METHOD FOR MIXING A LIQUID IN AN AUTOMATED ANALYZER

(71) Applicant: Siemens Healthcare Diagnostics Products GmbH, Marburg (DE)

(72) Inventors: Joachim Bernhard, Karben (DE); Christian Verhalen, Wiesbaden (DE)

(73) Assignee: Siemens Healthcare Diagnostics Products GmbH, Marburg (DE)

( * ) Notice: Subject to any disclaimer, the term of this patent is extended or adjusted under 35 U.S.C. 154(b) by 59 days.

(21) Appl. No.: 15/454,868

(22) Filed: Mar. 9, 2017

(65) Prior Publication Data

US 2017/0261525 A1 Sep. 14, 2017

(30) Foreign Application Priority Data

Mar. 10, 2016 (EP) .................. 16159578

(51) Int. Cl.
| | | |
|---|---|---|
| *G01N 35/00* | (2006.01) | |
| *G01N 1/38* | (2006.01) | |
| *G01N 35/10* | (2006.01) | |
| *B01F 11/00* | (2006.01) | |
| *B01F 15/00* | (2006.01) | |

(52) U.S. Cl.
CPC .... *G01N 35/00584* (2013.01); *B01F 11/0014* (2013.01); *B01F 11/0037* (2013.01); *B01F 15/00253* (2013.01); *G01N 1/38* (2013.01); *G01N 35/0099* (2013.01); *G01N 35/1002* (2013.01); *G01N 2001/386* (2013.01); *G01N 2035/00524* (2013.01)

(58) Field of Classification Search
None
See application file for complete search history.

(56) References Cited

U.S. PATENT DOCUMENTS

| | | | |
|---|---|---|---|
| 3,061,280 A | 10/1962 | Kraft et al. | |
| 3,809,322 A | 5/1974 | Hirosawa | |
| 5,104,231 A * | 4/1992 | Collier | B01F 11/0037 |
| | | | 366/208 |
| 2011/0086432 A1 | 4/2011 | Herz et al. | |

FOREIGN PATENT DOCUMENTS

| | | |
|---|---|---|
| DE | 816915 C | 10/1951 |
| DE | 19715566 A1 | 10/1998 |
| EP | 0356883 | 3/1990 |

(Continued)

OTHER PUBLICATIONS

European Office Action and Search Report of European Application No. 16159578.0-1703, dated Oct. 7, 2016.

(Continued)

*Primary Examiner* — Kathryn Wright
(74) *Attorney, Agent, or Firm* — Dugan & Dugan, PC

(57) ABSTRACT

The present invention lies in the field of automated analyzers and relates to a method for mixing liquids in liquid containers. The arrangement for automated mixing comprises a shaking device and a gripper which is connected by way of a flexible connecting element to a transfer arm and which serves for receiving a liquid container. The coupling of gripper and shaking device is realized by way of an eccentrically movable coupling pin and a coupling hole provided for this purpose.

13 Claims, 1 Drawing Sheet

(56) References Cited

FOREIGN PATENT DOCUMENTS

| EP | 2308588 A2 | 4/2011 |
| EP | 3176585 A1 | 6/2017 |
| GB | 2062481 A | 5/1981 |
| JP | H03296428 A | 12/1991 |
| JP | 2011-78969 A | 4/2011 |
| WO | WO 2016/017289 | 2/2016 |

OTHER PUBLICATIONS

Japanese Office Action of Japanese Application No. 2017-044482, dated Nov. 6, 2018.
Chinese Search Report of Chinese Application No. 2017100724859, dated Feb. 1, 2019.

* cited by examiner

FIG 1
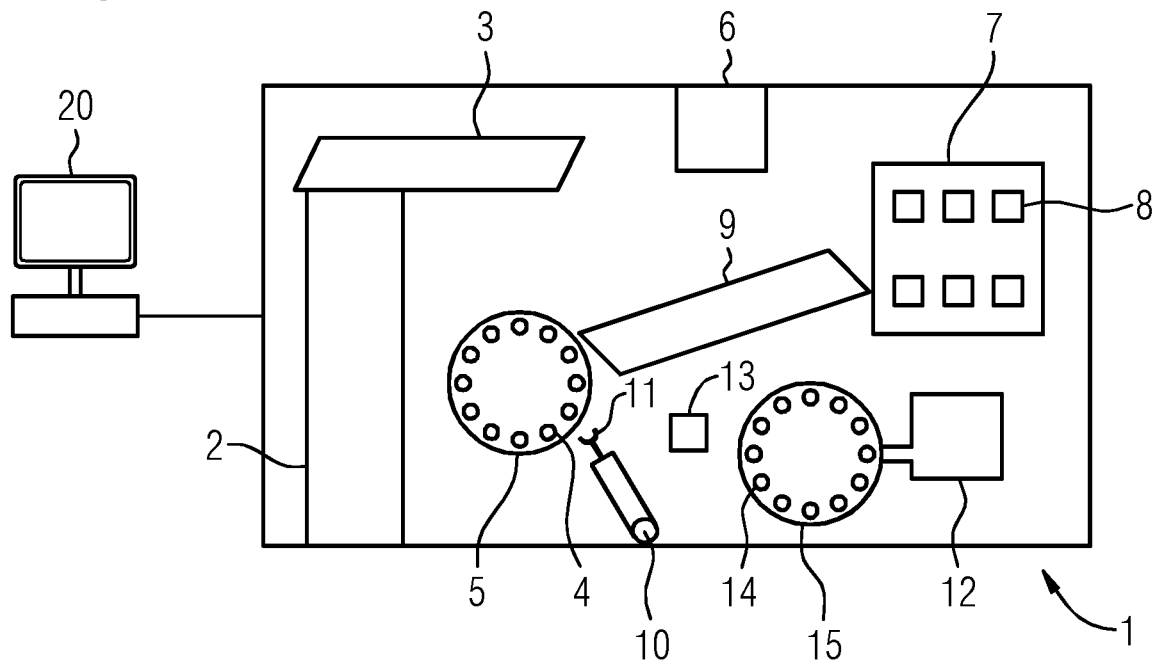
FIG 2
FIG 2A
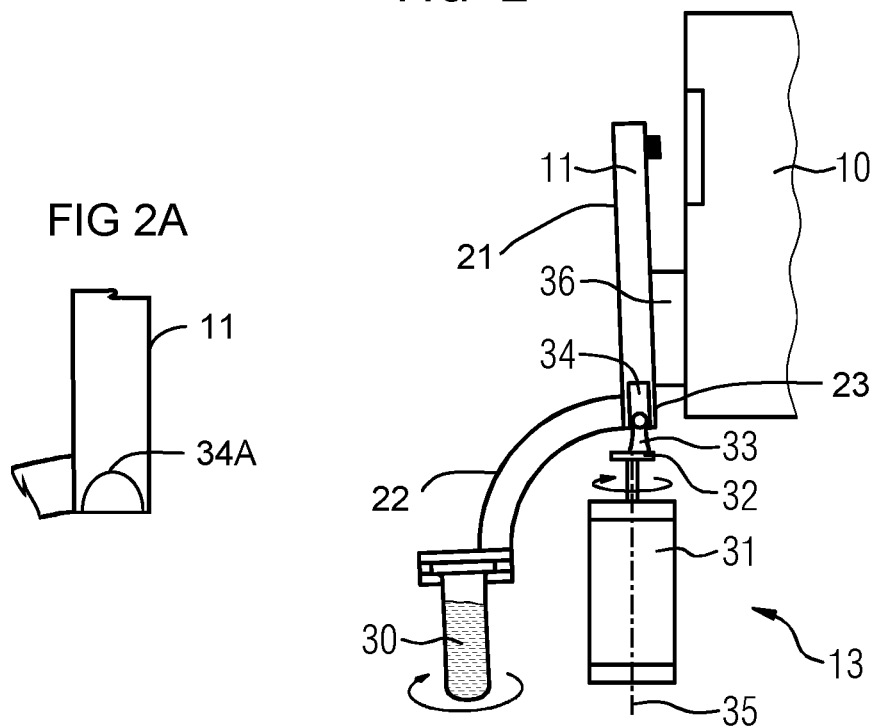

METHOD FOR MIXING A LIQUID IN AN AUTOMATED ANALYZER

CROSS REFERENCE TO RELATED APPLICATION

This claims priority to European Patent Application No. EP 16159578.0, filed Mar. 10, 2016, which is hereby incorporated by reference herein in its entirety for all purposes.

FIELD

The present invention lies in the field of automated analyzers and relates to a method for mixing liquids in liquid containers.

BACKGROUND

Current analyzers, as are used as a matter of routine in analytics, forensics, microbiology and clinical diagnostics, are able to carry out a multiplicity of detection reactions and analyses with a multiplicity of samples. In order to be able to carry out a multiplicity of examinations in an automated manner, various automatically operating apparatuses for the spatial transfer of measuring cells, reaction containers and reagent liquid containers are required, such as, e.g., transfer arms with a gripper function, transport belts or rotatable transport wheels, and apparatuses for transferring liquids, such as, e.g., pipetting apparatuses. The machines comprise a central control unit which, by means of appropriate software, is able to largely independently plan and work through the work steps for the desired analyses.

Many of the analysis methods used in such analyzers operating in an automated manner are based on optical methods. Measurement systems based on photometric (e.g., turbidimetric, nephelometric, fluorometric or luminometric) or radiometric measurement principles are particularly widespread. These methods enable the qualitative and quantitative detection of analytes in liquid samples without having to provide additional separation steps. The determination of clinically relevant parameters, such as, e.g., the concentration or the activity of an analyte, is often implemented by virtue of an aliquot of a bodily fluid of a patient being mixed simultaneously or in succession with one or more reagent liquids in a reaction vessel, as a result of which a biochemical reaction is put into motion, which brings about a measurable change in an optical property of the test preparation.

The measurement result is, in turn, forwarded into a memory unit by the measurement system and evaluated. Subsequently, the analyzer supplies a user with sample-specific measurement values by way of an output medium, such as, e.g., a monitor, a printer or a network connection.

For the spatial transfer of liquid containers, provision is often made of grippers for gripping, holding and releasing a liquid container, said grippers being connected by way of a flexible connecting element to a horizontally and vertically movable transfer arm. EP-A2-2308588 describes an apparatus for transferring a liquid container, in particular for transferring tube-shaped reaction vessels (cuvettes), within an automated analyzer. The apparatus comprises a passive, elastically deformable gripper for a force-fit capture and hold of a liquid container and is suitable for receiving an individual cuvette placed in a receiving position, transporting said cuvette to a target position and putting it down there in a further receiving position.

Furthermore, it is often necessary for liquids contained in liquid containers to be mixed. To achieve precise measurement results, it is for example necessary for reaction mixes, that is to say, mixtures of a sample liquid to be analyzed, such as, for example, blood, plasma, serum, urine etc., with one or more reagent liquids, such as, for example, antibody solutions or the like, to be mixed uniformly. It may likewise be necessary for reagent liquids which contain sedimentable contents, such as, for example, particulate solid phases, such as, for example, antibody-coated latex particles, to be mixed prior to use in order that a homogeneous solution is formed.

For this purpose, FIG. 1 of EP-A2-2308588 describes a shaking device having a coupling pin which is movable about a vertical axis of rotation. For the mixing of a liquid sample in a liquid container, a method comprising the following steps is described:
  a. receiving the liquid container by way of a gripper which is fastened by way of a flexible connecting element to an automatically movable transfer arm, wherein the gripper has a coupling hole; then
  b. displacing the gripper with the liquid container to the shaking device; then
  c. producing a connection between the gripper and the shaking device, wherein the connection is realized by insertion of the coupling pin of the shaking device into the coupling hole, which is provided on the gripper, in a direction coaxial with respect to the axis of rotation of the coupling pin; and then
  d. moving the coupling pin.

The coupling pin moves eccentrically on a circular path and forces the decoupled gripper, and thus the liquid container and the liquid contained therein, to perform said circular movement, whereby mixing of the contained liquid is effected.

Theoretically, the gripper moves synchronously with the rotating coupling pin. In practice, it has however been observed that the contact or the coupling between coupling pin of the shaking device and coupling hole of the gripper is possibly at least briefly eliminated owing to the contact pin losing contact with the inner wall of the coupling hole. When the contact is subsequently restored, brief shocks can occur, which can likewise have an adverse effect on the mixing process.

Specifically, the opening of the coupling hole is normally slightly larger than the head end, which engages into it, of the coupling pin, in order that, during the coupling-in process, highly precise positioning of the coupling hole over the coupling pin, which would significantly slow the entire mixing process, can be dispensed with. Narrower manufacturing tolerances with regard to the coupling mechanism composed of the coupling pin and coupling hole would result in increased abrasion and wear, as a result of which more frequent exchange of the parts involved would be necessary, which in turn would result in increased maintenance outlay for the automated analyzer.

Owing to the brief elimination of contact between the coupling pin and coupling hole, a situation may arise in which a liquid sample is not mixed as desired, and as a result, an erroneous measurement result is generated.

The problem on which the present invention is based thus consists in improving the automated method, described in the introduction, for mixing a liquid sample in a liquid container such that the mixing process takes place uniformly, that is to say without undesired interruption, in order to thereby achieve the desired mixing result.

SUMMARY

The object is achieved according to the invention in that, after the insertion of the coupling pin of the shaking device into the coupling hole provided on the gripper, the gripper or the shaking device is firstly displaced perpendicular to the axis of rotation of the movable coupling pin before the coupling pin is set in motion.

This has the effect that a preload is generated between the inner wall of the coupling hole in the gripper and the coupling pin, which preload intensifies the contact between coupling pin and gripper, such that the coupling pin is prevented from jumping out of the coupling hole during the subsequent mixing process. This has the effect that the mixing process takes place uniformly, that is to say without undesired interruption, and that, as a result, erroneous measurement results owing to inadequately mixed reaction mixes or reagent liquids are avoided.

Accordingly, the present invention relates to a method for mixing a liquid in a liquid container, the method comprising the steps:

a. receiving the liquid container by way of a gripper which is fastened by way of a flexible connecting element to an automatically movable transfer arm, wherein the gripper has a coupling hole; then b. displacing the gripper with the liquid container to a shaking device with a coupling pin which is movable about a vertical axis of rotation; then c. producing a connection between the gripper and the shaking device, wherein the connection is realized by insertion of the coupling pin of the shaking device into the coupling hole, which is provided on the gripper, in a direction coaxial with respect to the axis of rotation of the coupling pin; and then d. moving the coupling pin;

wherein, after the insertion of the coupling pin of the shaking device into the coupling hole provided on the gripper in step c), the gripper or the shaking device is firstly displaced perpendicular to the axis of rotation of the movable coupling pin before the coupling pin is set in motion.

The gripper is preferably displaced perpendicularly with respect to the axis of rotation of the movable coupling pin by horizontal displacement of the transfer arm to which the gripper is fastened. This embodiment is expedient in particular if the shaking device is installed so as to be static. Nevertheless, it is self-evidently possible for a horizontally movable shaking device to be provided which moves horizontally and is thus displaced perpendicularly with respect to the axis of rotation of the movable coupling pin.

The gripper or the shaking device is preferably displaced perpendicularly with respect to the axis of rotation of the movable coupling pin until the inner wall of the coupling hole exerts a transverse force on the coupling pin, before the coupling pin is set in motion.

The method is suitable in particular for the mixing of liquids to be analyzed, for example, bodily fluids, such as blood, plasma, serum, urine, amniotic fluid, etc., wastewater samples, cell culture supernatants, of reagent liquids, that is to say liquids which contain one or more substances for detection of one or more analytes, such as, for example, antibody solutions, pigment solutions, etc., or of reaction mixes, that is to say mixtures of a liquid to be analyzed and one or more reagent liquids.

A liquid container may, for example, be a primary sample vessel, such as, for example, a blood sampling tube, which contains a liquid to be analyzed, or a reaction vessel, such as, for example, a transparent, tube-shaped cuvette, in which a primary sample is mixed with the one or more reagents to form a reaction mix, which is then measured in a measurement station, or a reagent liquid container which contains a liquid which contains one or more substances for detection of one or more analytes. The reagent liquid container may furthermore be of multi-chamber form, and may contain multiple different reagent liquids.

The gripper that is fastened to an automatically displaceable transfer arm is preferably part of an apparatus for transferring a liquid container from a first receiving position into a second receiving position. The gripper may be part of a mechanical, magnetic, pneumatic or adhesive gripping system. A mechanical gripper may be in the form of a single-finger, two-finger or multi-finger gripper, and may be of rigid, articulated or elastic design. The gripper is preferably a passive clamping gripper for gripping and holding a liquid container with non-positively locking action. Said clamping gripper may be of unipartite and elastically deformable form.

In a preferred embodiment of the method according to the invention, a passive gripper is used for gripping and holding a liquid container with non-positively locking action. The gripper may be of unipartite and elastically deformable form. The gripper is preferably in a stressed state, such that, when it is pressed with sufficient force against a liquid container, a snap-action effect occurs, and the gripper opens and grips and holds the liquid container. Conversely, the gripper opens again, and releases the liquid container, only when the gripper is moved with sufficient force away from a fixed liquid container.

The flexible connecting element that is provided for the fastening of the gripper to the automatically displaceable transfer arm has the effect that the movement of the shaking device is transmitted predominantly to the liquid container and not to the transfer arm. For this purpose, the flexible connecting element is preferably composed of an elastic and/or damping material, such as, for example, an elastomer, urethane rubber, natural rubber, rubber, foamed material or spring steel. The flexible connecting element may be of unipartite form or composed of multiple separate individual elements.

The shaking device has a coupling pin which is movable about a vertical axis of rotation and which is driven by a motor. The coupling pin is preferably moved on a circular path in a horizontal plane. For this purpose, the coupling pin may be attached to a plate which is movable about a vertical axis of rotation. Typical frequencies for the movement of the coupling pin lie between 30 and 70 revolutions per second.

The coupling pin of the shaking device preferably has a spherical head end. This permits coupling to the complementary coupling hole in the gripper with particularly low friction. The coupling pin may be composed of different materials, preferably of plastic or metal.

The coupling hole provided on the gripper preferably has a shape complementary to the shape of the coupling pin, preferably a hemispherical or circular cylindrical shape. In the simplest embodiment, the coupling hole is a corresponding bore in the gripper.

A further subject of the present invention is an automated analyzer having i) an apparatus for transferring a liquid container, the apparatus comprising a horizontally and vertically movable transfer arm and a gripper which is connected by way of a flexible connecting element to the transfer arm and which serves for gripping, holding and releasing a liquid container, wherein the gripper has a coupling hole, ii) multiple receiving positions for receiving in each case one liquid container, iii) a shaking device having a coupling pin which is movable about a vertical axis of rotation, and iv) having a control apparatus which is configured so as to control the above-described method according to the invention for mixing a liquid in a liquid container.

In particular, the control apparatus of the automated analyzer according to the invention is configured so as to control a method for mixing a liquid in a liquid container, the method comprising the following steps:

a. receiving a liquid container from a receiving position by way of the gripper; then b. displacing the gripper with the liquid container to the shaking device; then c. producing a connection between the gripper and the shaking device, wherein the connection is realized by insertion of the coupling pin of the shaking device into the coupling hole, which is provided on the gripper, in a direction coaxial with respect to the axis of rotation of the coupling pin; and then d. moving the coupling pin;

and wherein, after the insertion of the coupling pin of the shaking device into the coupling hole provided on the gripper in step c), the gripper or the shaking device is firstly displaced perpendicular to the axis of rotation of the movable coupling pin before the coupling pin is set in motion.

The embodiments and advantages described further above for the method according to the invention apply analogously to the analyzer according to the invention.

In one embodiment of the automatic analyzer, the coupling pin of the shaking device is attached to a plate which is movable about a vertical axis of rotation.

In a further embodiment of the automated analyzer, the coupling pin of the shaking device has a spherical head end.

In a yet further embodiment of the automated analyzer, the coupling hole provided on the gripper has a hemispherical or circular cylindrical shape.

The apparatus for transferring a liquid container is preferably provided for transferring a liquid container from the group comprising reaction vessel and reagent liquid container.

A further embodiment of the automated analyzer is additionally equipped so as to have an incubation device with multiple receiving positions for in each case one reaction vessel and so as to have a receiving device which is assigned to a measurement station and which has multiple receiving positions for in each case one reaction vessel. The receiving of a liquid container from a receiving position by way of the gripper in step a) is the receiving of a reaction vessel filled with a reaction mix from a receiving position of the incubation device, and the control apparatus of an analyzer of said type is furthermore configured such that, after the mixing of the reaction mix in the reaction vessel, the reaction vessel is transferred, by the apparatus for transferring a liquid container, into a receiving position of the receiving device assigned to the measurement station. There, the measurement of the reaction mix can be performed without the risk of measurement errors caused by inadequate mixing.

BRIEF DESCRIPTION OF THE DRAWINGS

Below, the invention is explained on the basis of a drawing.

In detail:

FIG. 1 shows an automated analyzer according to the invention;

FIG. 2 shows an arrangement for mixing a reaction mix in a cuvette.

FIG. 2A schematically shows a coupling hole 34A having a hemispherical or circular cylindrical shape provided on a gripper 11.

Identical parts are denoted by the same reference designations in all of the figures.

DETAILED DESCRIPTION

FIG. 1 is a schematic illustration of an automated analyzer 1 with some of the components contained therein. Here, only the most important components are illustrated in a much simplified manner in order to explain the basic functionality of the automated analyzer 1 without depicting the individual parts of each component in detail.

The automated analyzer 1 is embodied to carry out very different types of analyses of blood or other bodily fluids in a fully automated manner, without this requiring activity by a user. Necessary interventions of a user instead are restricted to servicing or repairing and refill work, for example, if cuvettes need to be refilled or liquid containers need to be replaced.

The patient samples are fed to the automated analyzer 1 via a feed track 2 on carriages not depicted in detail. Information concerning the analyses to be carried out for each sample may, for example, be transferred by means of barcodes which are attached to the sample vessels and which are read in the automated analyzer 1. With the aid of a first pipetting apparatus 3, sample aliquots are removed from the sample vessels by means of a pipetting needle.

The sample aliquots are likewise fed to cuvettes (not depicted in any more detail), which are arranged in receiving positions 4 of a rotatable incubation device 5 which is temperature controlled to 37° C. The cuvettes are removed from a cuvette storage container 6. Reagent vessels 8 with various reagent liquids are stored in the reagent vessel storage container 7, which is cooled to approximately 8-10° C. Reagent liquid is taken from a reagent vessel 8 by means of the pipetting needle of a second pipetting apparatus 9 and administered into a cuvette, which already contains a sample aliquot, for providing a reaction mix. By means of the transfer arm 10, the cuvette with the reaction mix is taken from a receiving position 4 of the incubation device 5 with a gripper 11 and transferred to a shaking device 13 (not illustrated in any more detail in FIG. 2) for mixing the reaction mix. After completing the mixing process, the cuvette is transported onward into a receiving position 14 of the rotatable receiving device 15 for the photometric measurement station 12, where the absorption of the reaction mix is measured.

The entire process is controlled by a control unit 20, such as, e.g., a computer connected by way of a data line, supported by a multiplicity of further electronic circuits and microprocessors, not depicted in any more detail, within the automated analyzer 1 and the components thereof.

FIG. 2 shows the gripper 11 having a first section 21 which is fastened by way of a flexible connecting element 36 to an automatically displaceable transfer arm 10, which gripper also has a holder 22 that holds a cuvette 30 filled with a reaction mix. By way of vertical lowering of the transfer arm 10, the gripper 11 has been positioned above the shaking device 13. The shaking device 13 is composed of a motor 31 which has a plate 32 with an eccentric coupling pin 33. The gripper 11 has been positioned such that the coupling pin 33 has been inserted with the spherical head end substantially centrally into the coupling hole 34 provided on a bottom portion 23 of the first section 21 of the gripper. Before the coupling pin 33 is now set in motion by rotation of the plate 32, the gripper 11 is, by way of a horizontal movement of the transfer arm 10, displaced perpendicularly with respect to the axis of rotation 35 of the movable coupling pin 33 until the coupling pin 33 makes contact with an inner side of the coupling hole 34, and thus a preload/transverse force is generated between the inner wall of the coupling hole 34 and the coupling pin 33, which preload/transverse force intensifies the contact between coupling pin 33 and gripper 11. In this way, the coupling pin 33 is prevented from jumping out of the coupling hole 34 during the subsequent mixing process, and the mixing process can take place uniformly and without undesired interruption.

LIST OF REFERENCES SIGNS

1 Analyzer
2 Feed track
3 Pipetting apparatus
4 Receiving position
5 Incubation device
6 Cuvette storage container
7 Reagent vessel storage container
8 Reagent vessel
9 Pipetting apparatus
10 Transfer arm
11 Gripper
12 Measurement station
13 Shaking device
14 Receiving position
15 Receiving device
20 Control unit
21 First section
22 Holder
23 Bottom portion
30 Cuvette
31 Motor
32 Plate
33 Coupling pin
34 Coupling hole
35 Axis of rotation
36 Flexible connecting element

What is claimed is:

1. A method for mixing a liquid in a liquid container, the method comprising:
   (a) receiving the liquid container via a gripper which is fastened by a flexible connecting element to an automatically movable transfer arm, wherein the gripper has a first section having a coupling hole and a holder extending outward from a bottom portion of the first section adjacent the coupling hole, a distal end of the holder configured to hold the liquid container; then
   (b) displacing the gripper with the liquid container to a shaking device having a coupling pin which is movable about a vertical axis of rotation; then
   (c) inserting the coupling pin of the shaking device into the coupling hole of the gripper in a direction coaxial with the vertical axis of rotation of the coupling pin; then
   (d) horizontally displacing the transfer arm such that the gripper is displaced perpendicular to the vertical axis of rotation of the movable coupling pin until an inner wall of the coupling hole exerts a transverse force on the coupling pin; and then
   (e) moving the coupling pin.

2. The method as claimed in claim 1, wherein the liquid is from a group of bodily fluid and reaction mix.

3. An automated analyzer having:
   an apparatus for transferring a liquid container, the apparatus comprising a horizontally and vertically movable transfer arm and a gripper which is connected by a flexible connecting element to the transfer arm and which serves for gripping, holding and releasing the liquid container, wherein the gripper has a first section having a coupling hole and a holder extending outward from a bottom portion of the first section adjacent the coupling hole, a distal end of the holder configured to grip, hold, and release the liquid container,
   multiple first receiving positions each configured to receive one liquid container,
   a shaking device having a coupling pin which is movable about a vertical axis of rotation,
   a photometric measurement station operative to measure adsorption of a reaction mix in the liquid container received from the shaking device, and
   a control apparatus configured to control a method for mixing a liquid in the liquid container, the method comprising:
      (a) receiving the liquid container from one of the multiple first receiving positions via the gripper; then
      (b) displacing the gripper with the liquid container to the shaking device; then
      (c) inserting the coupling pin of the shaking device into the coupling hole of the gripper in a direction coaxial with the vertical axis of rotation of the coupling pin; then
      (d) horizontally displacing the transfer arm such that the gripper is displaced perpendicular to the vertical axis of rotation of the movable coupling pin until an inner wall of the coupling hole exerts a transverse force on the coupling pin; and then
      (e) moving the coupling pin.

4. The automated analyzer as claimed in claim 3, in which the coupling pin of the shaking device is attached to a plate which is movable about the vertical axis of rotation.

5. The automated analyzer as claimed in claim 3, in which the coupling pin of the shaking device has a spherical head end.

6. The automated analyzer as claimed in claim 3, in which the coupling hole provided on the gripper has a hemispherical or circular cylindrical shape.

7. The automated analyzer as claimed in claim 3, in which the apparatus for transferring the liquid container is provided for transferring the liquid container from a group comprising a reaction vessel and a reagent liquid container.

8. The automated analyzer as claimed in claim 7, additionally having an incubation device that includes the multiple first receiving positions each configured to receive one reaction vessel and additionally having a receiving device which is assigned to the photometric measurement station and which has multiple second receiving positions each configured to receive one reaction vessel, wherein the receiving of the liquid container from one of the first receiving positions via the gripper in step (a) comprises receiving a reaction vessel filled with a reaction mix from the one of the multiple first receiving positions of the incubation device, and wherein the control apparatus is furthermore configured such that, after mixing of the reaction mix in the reaction vessel, the reaction vessel is transferred, by the apparatus for transferring a liquid container, into one of the multiple second receiving positions of the receiving device assigned to the photometric measurement station.

9. A method for mixing a liquid in a liquid container, the method comprising:
   (a) receiving the liquid container via a gripper which is fastened by a flexible connecting element to an automatically movable transfer arm, wherein the gripper has a first section having a coupling hole and a holder extending outward from a bottom portion of the first section adjacent the coupling hole, a distal end of the holder configured to hold the liquid container; then
   (b) displacing the gripper with the liquid container to a shaking device having a coupling pin which is movable about a vertical axis of rotation; then
   (c) inserting the coupling pin of the shaking device into the coupling hole of the gripper in a direction coaxial with the vertical axis of rotation of the coupling pin; then
   (d) displacing the shaking device perpendicular to the vertical axis of rotation of the movable coupling pin until an inner wall of the coupling hole exerts a transverse force on the coupling pin; and then
   (e) moving the coupling pin.

10. The method as claimed in claim 9, in which the coupling pin of the shaking device is attached to a plate which is movable about the vertical axis of rotation.

11. The method as claimed in claim 9, in which the coupling pin of the shaking device has a spherical head end.

12. The method as claimed in claim 9, in which the coupling hole provided on the gripper has a hemispherical or circular cylindrical shape.

13. The method as claimed in claim 9, in which the apparatus for transferring the liquid container is provided for transferring the liquid container from a group comprising a reaction vessel and a reagent liquid container.

* * * * *